United States Patent
Watanabe

(10) Patent No.: US 12,031,040 B2
(45) Date of Patent: *Jul. 9, 2024

(54) TREAD RUBBER COMPOSITION AND PNEUMATIC TIRE

(71) Applicant: Sumitomo Rubber Industries, Ltd., Hyogo (JP)

(72) Inventor: Kenya Watanabe, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,956

(22) Filed: Oct. 14, 2021

(65) Prior Publication Data

US 2022/0033625 A1 Feb. 3, 2022

Related U.S. Application Data

(62) Division of application No. 16/518,720, filed on Jul. 22, 2019, now Pat. No. 11,174,375.

(30) Foreign Application Priority Data

Aug. 6, 2018 (JP) ................................ 2018-147630

(51) Int. Cl.
| | | |
|---|---|---|
| C08L 9/06 | (2006.01) | |
| B60C 1/00 | (2006.01) | |
| C08K 3/04 | (2006.01) | |
| C08K 3/06 | (2006.01) | |
| C08K 3/22 | (2006.01) | |
| C08K 3/36 | (2006.01) | |
| C08K 5/09 | (2006.01) | |
| C08L 7/00 | (2006.01) | |
| C08L 9/00 | (2006.01) | |
| C08L 91/06 | (2006.01) | |
| B60C 11/00 | (2006.01) | |

(52) U.S. Cl.
CPC .............. *C08L 9/06* (2013.01); *B60C 1/0016* (2013.01); *C08K 3/04* (2013.01); *C08K 3/06* (2013.01); *C08K 3/22* (2013.01); *C08K 3/36* (2013.01); *C08K 5/09* (2013.01); *C08L 7/00* (2013.01); *C08L 9/00* (2013.01); *C08L 91/06* (2013.01); *B60C 2011/0025* (2013.01); *C08K 2003/2296* (2013.01); *C08L 2205/02* (2013.01)

(58) Field of Classification Search
CPC ...... C08L 9/06; C08L 7/00; C08L 9/00; C08L 91/06; C08L 2205/02; C08L 25/16; C08L 91/00; C08L 83/08; B60C 1/0016; B60C 2011/0025; C08K 3/04; C08K 3/36; C08K 3/06; C08K 5/09; C08K 3/22; C08K 5/18; C08K 5/47; C08K 5/31

See application file for complete search history.

(56) References Cited

U.S. PATENT DOCUMENTS

| | | | |
|---|---|---|---|
| 4,945,964 A | 8/1990 | Takiguchi et al. | |
| 5,430,086 A | 7/1995 | Saito et al. | |
| 5,658,987 A | 8/1997 | Nakamura et al. | |
| 7,259,205 B1 * | 8/2007 | Pagliarini | B60C 1/0016 |
| | | | 524/495 |
| 11,174,375 B2 * | 11/2021 | Watanabe | C08K 3/04 |
| 2008/0110552 A1 * | 5/2008 | Arnold | B60C 1/0016 |
| | | | 524/847 |
| 2013/0331498 A1 | 12/2013 | Miyazaki | |
| 2014/0171557 A1 | 6/2014 | Ringot | |
| 2016/0046781 A1 | 2/2016 | Miyazaki | |
| 2016/0200901 A1 | 7/2016 | Tsuchida et al. | |
| 2017/0137615 A1 | 5/2017 | Nakajima | |
| 2017/0218187 A1 | 8/2017 | Ringot | |
| 2017/0341468 A1 | 11/2017 | Miyazaki | |
| 2019/0062538 A1 | 2/2019 | Miyazaki | |
| 2019/0390043 A1 | 12/2019 | Nakajima | |

FOREIGN PATENT DOCUMENTS

| | | |
|---|---|---|
| FR | 2974808 A1 | 11/2012 |
| JP | S62-048739 A | 3/1987 |
| JP | H07-179669 A | 7/1995 |
| JP | H09-077912 A | 3/1997 |
| JP | 2001-233994 A | 8/2001 |
| JP | 2005-008804 A | 1/2005 |
| JP | 2006-056979 A | 3/2006 |
| JP | 2006-143804 A | 6/2006 |
| JP | 2008-088236 A | 4/2008 |
| JP | 2008-143484 A | 6/2008 |
| JP | 2015-059140 A | 3/2015 |
| JP | 2015-229701 A | 12/2015 |
| WO | 2016/104144 A1 | 6/2016 |
| WO | 2017/046771 A1 | 3/2017 |
| WO | 2017/199688 A1 | 11/2017 |
| WO | 2018/002539 A1 | 1/2018 |
| WO | 2019/154866 A1 | 8/2019 |

OTHER PUBLICATIONS

Machine translation of JP 2005-8804 (Year: 2005).*

* cited by examiner

Primary Examiner — Doris L Lee
(74) Attorney, Agent, or Firm — Studebaker & Brackett PC

(57) ABSTRACT

Provided are a tread rubber composition which provides a balanced improvement in wet grip performance and resistance to low-temperature brittleness, and a pneumatic tire including a tread at least partially containing the rubber composition. The present invention relates to a tread rubber composition containing a styrene-butadiene rubber and having a tan δ peak temperature of −10° C. or higher and a brittleness temperature of −40° C. or lower.

12 Claims, No Drawings

TREAD RUBBER COMPOSITION AND PNEUMATIC TIRE

CROSS-REFERENCE TO RELATED APPLICATIONS

This application is a Divisional of U.S. patent application Ser. No. 16/518,720 filed Jul. 22, 2019, which claims benefit of priority to Japanese Patent Application No. 2018-147630 filed Aug. 6, 2018, the entire content of which is incorporated herein by reference.

TECHNICAL FIELD

The present invention relates to a tread rubber composition and a pneumatic tire.

BACKGROUND ART

It has been desirable to provide good wet grip performance as a key tire property to ensure improved driving safety. It is generally known that wet grip performance may be improved by increasing the hysteresis loss of a tire tread rubber. To this end, it is well known to increase the tan δ peak temperature of the tan δ-temperature dependence curve of the rubber.

CITATION LIST

Patent Literature

Patent Literature 1: JP 2006-056979 A

SUMMARY OF INVENTION

However, the present inventor has discovered as a result of many experiments that the method of increasing the tan δ peak temperature of the rubber inevitably raises the brittleness temperature thereof and thus may cause the rubber to undergo brittle fracture to form cracks on the tread surface or groove bottom during storage of the tire, especially in winter.

The present invention aims to solve the problem and provide a tread rubber composition which provides a balanced improvement in wet grip performance and resistance to low-temperature brittleness, and a pneumatic tire including a tread at least partially containing the rubber composition.

Solution to Problem

The present inventor has done extensive research on the problem newly discovered by the inventor and found that a balanced improvement in wet grip performance and resistance to low-temperature brittleness can be achieved by adjusting the tan δ peak temperature to a predetermined temperature or higher to enhance wet grip performance while adjusting the brittleness temperature to a predetermined temperature or lower to enhance resistance to low-temperature brittleness. This finding has led to the present invention.

Specifically, the present invention relates to a tread rubber composition, containing a styrene-butadiene rubber and having a tan δ peak temperature of −10° C. or higher and a brittleness temperature of −40° C. or lower.

The rubber composition preferably has a tan δ peak temperature of −8° C. or higher, more preferably −6° C. or higher.

The rubber composition preferably has a brittleness temperature of −42° C. or lower, more preferably −45° C. or lower.

The rubber composition preferably contains, based on 100% by mass of a rubber component therein, 20 to 90% by mass of the styrene-butadiene rubber.

The rubber composition preferably contains at least one of a polybutadiene rubber or isoprene-based rubber.

Another aspect of the present invention relates to a pneumatic tire, including a tread at least partially containing the rubber composition.

Advantageous Effects of Invention

The tread rubber composition of the present invention contains a styrene-butadiene rubber and has a tan δ peak temperature of −10° C. or higher and a brittleness temperature of −40° C. or lower. This tread rubber composition provides a balanced improvement in wet grip performance and resistance to low-temperature brittleness.

DESCRIPTION OF EMBODIMENTS

The tread rubber composition of the present invention contains a styrene-butadiene rubber and has a tan δ peak temperature of −10° C. or higher and a brittleness temperature of −40° C. or lower. With this tread rubber composition, it is possible to achieve a balanced improvement in wet grip performance and resistance to low-temperature brittleness.

The reason why this rubber composition has the above effect is not completely clear, but may be explained as follows.

A higher tan δ peak temperature leads to better wet grip performance. However, as the tan Speak temperature increases, the brittleness temperature increases as well, possibly resulting in reduced resistance to low-temperature brittleness.

Conversely, a lower brittleness temperature leads to better resistance to low-temperature brittleness. However, as the brittleness temperature decreases, the tan δ peak temperature decreases as well, possibly resulting in reduced wet grip performance.

As described, wet grip performance and resistance to low-temperature brittleness are in a trade-off relationship. Thus, it has been difficult to achieve a balanced improvement in both properties.

As a result of extensive experimentation on this problem, the present inventor has found that when a rubber composition containing a styrene-butadiene rubber is adjusted to have a predetermined tan δ peak temperature or higher and a predetermined brittleness temperature or lower, the rubber composition provides a balanced improvement in wet grip performance and resistance to low-temperature brittleness.

In other words, when a rubber composition containing a styrene-butadiene rubber which has a high hysteresis loss and can increase the tan δ peak temperature is adjusted to have tan δ peak and brittleness temperatures each within a predetermined temperature range, the rubber composition more suitably achieves a balanced improvement in wet grip performance and resistance to low-temperature brittleness.

The tan δ peak temperature and brittleness temperature are determined by analyzing the rubber composition after it is vulcanized.

To obtain good wet grip performance, the (vulcanized) rubber composition has a tan δ peak temperature of −10° C. or higher, preferably −8° C. or higher, more preferably −6° C. or higher. The upper limit of the tan δ peak temperature is not particularly limited, but is preferably 0° C. or lower, more preferably −2° C. or lower, still more preferably −4° C. or lower, to obtain good resistance to low-temperature brittleness.

The tan δ peak temperature is measured as described later in EXAMPLES.

The term "tan δ peak temperature" as used herein refers to the temperature corresponding to the maximum tan δ in a temperature dependence curve of tan δ measured by viscoelastic testing.

To obtain good resistance to low-temperature brittleness, the (vulcanized) rubber composition has a brittleness temperature of −40° C. or lower, preferably −42° C. or lower, more preferably −45° C. or lower, still more preferably −50° C. or lower, particularly preferably −55° C. or lower. The lower limit of the brittleness temperature is not particularly limited, but is preferably −65° C. or higher, more preferably −60° C. or higher, to obtain good wet grip performance.

The term "brittleness temperature" as used herein refers to the "50% brittleness temperature" determined in accordance with JIS K 6261-2:2017 "Rubber, vulcanized or thermoplastic—Determination of low-temperature properties—Part 2: Low-temperature brittleness".

The tan δ peak temperature and brittleness temperature of the rubber composition can be controlled by varying the types and amounts of chemicals, in particular rubber and resin components, used in the rubber composition. For example, incorporating a high softening point resin tends to increase the tan δ peak temperature; incorporating a low glass transition temperature rubber component (e.g., polybutadiene rubber, isoprene-based rubbers) tends to reduce the brittleness temperature; increasing the amount of fillers tends to increase the brittleness temperature; using silica as a filler tends to increase the tan Speak temperature; and increasing the amount of softeners tends to reduce the brittleness temperature.

In more detail, the specified tan δ peak temperature and brittleness temperature can be imparted to the vulcanized rubber composition, for example, by appropriately selecting rubber and resin components as described later or appropriately adjusting their amounts. Specifically, the tan δ peak temperature and brittleness temperature may be controlled by incorporating a high softening point resin to increase the tan δ peak temperature, and at the same time incorporating a low glass transition temperature rubber component (e.g., polybutadiene rubber, isoprene-based rubbers) to prevent too high a brittleness temperature, while appropriately adjusting the amounts of both components (the high softening point resin and the low glass transition temperature rubber component). In particular, the tan δ peak temperature and brittleness temperature may be more suitably controlled by appropriately adjusting the amounts of the high softening point resin, low glass transition temperature rubber component, and styrene-butadiene rubber.

Usable chemicals are described below.

The rubber component of the rubber composition includes a styrene-butadiene rubber (SBR).

Any SBR may be used, including those commonly used in the tire industry such as emulsion-polymerized SBR (E-SBR) and solution-polymerized SBR (S-SBR). These may be used alone, or two or more of these may be used in combination.

The rubber component preferably has a weight average molecular weight (Mw) of 150,000 or more, more preferably 350,000 or more. The upper limit of the Mw is not particularly limited, but is preferably 4,000,000 or less, more preferably 3,000,000 or less.

The use of SBR with higher styrene and/or vinyl contents tends to result in a rubber composition having a higher tan δ peak temperature.

The SBR preferably has a styrene content of 5% by mass or higher, more preferably 10% by mass or higher, still more preferably 15% by mass or higher, but preferably 50% by mass or lower, more preferably 45% by mass or lower, still more preferably 40% by mass or lower. When the styrene content is within the range indicated above, the advantageous effect tends to be more suitably achieved.

The SBR preferably has a vinyl content of 5% by mass or higher, more preferably 10% by mass or higher, still more preferably 15% by mass or higher, but preferably 50% by mass or lower, more preferably 45% by mass or lower. When the vinyl content is within the range indicated above, the advantageous effect tends to be more suitably achieved.

The SBR may be unmodified SBR or a modified SBR.

The modified SBR may be any SBR having a functional group interactive with a filler such as silica. For example, it may be a chain end-modified SBR obtained by modifying at least one chain end of SBR with a compound (modifier) having the functional group (i.e., a chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a polyfunctional compound having two or more epoxy groups in the molecule so that a hydroxyl or epoxy group is introduced thereinto. These may be used alone, or two or more of these may be used in combination.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. Preferred among these are amino (preferably amino whose hydrogen atom is replaced with a C1-C6 alkyl group), alkoxy (preferably C1-C6 alkoxy), alkoxysilyl (preferably C1-C6 alkoxysilyl), and amide groups.

The SBR may be a commercial product manufactured or sold by, for example, Sumitomo Chemical Co., Ltd., JSR Corporation, Asahi Kasei Corporation, Zeon Corporation, or ARLANXEO.

The amount of the SBR based on 100% by mass of the rubber component is preferably 20% by mass or more, more preferably 40% by mass or more, still more preferably 50% by mass or more, particularly preferably 55% by mass or more, but is preferably 90% by mass or less, more preferably 80% by mass or less, still more preferably 70% by mass or less, particularly preferably 65% by mass or less. When the amount is within the range indicated above, the advantageous effect tends to be better achieved.

Examples of materials other than SBR that may be used in the rubber component include diene rubbers such as isoprene-based rubbers, polybutadiene rubber (BR), styrene-isoprene-butadiene rubber (SIBR), acrylonitrile butadiene rubber (NBR), chloroprene rubber (CR), and butyl rubber (IIR). The rubber component may be a single rubber or a combination of two or more rubbers. Among these, BR and/or isoprene-based rubbers are preferred, with BR being more preferred.

Any BR may be used, including those commonly used in the tire industry. These may be used alone, or two or more of these may be used in combination.

The BR preferably has a cis content of 10% by mass or higher, more preferably 20% by mass or higher, still more preferably 95% by mass or higher, particularly preferably 97% by mass or higher. The upper limit of the cis content is not particularly limited and may be 100% by mass.

The BR may be either unmodified BR or a modified BR.

Examples of the modified BR include those into which the above-mentioned functional groups are introduced. Preferred embodiments of the modified BR are as described for the modified SBR.

The BR may be a commercial product of, for example, Ube Industries, Ltd., JSR Corporation, Asahi Kasei Corporation, or Zeon Corporation.

The amount of the BR based on 100% by mass of the rubber component is preferably 10% by mass or more, more preferably 20% by mass or more, still more preferably 25% by mass or more, particularly preferably 30% by mass or more, but is preferably 60% by mass or less, more preferably 50% by mass or less. When the amount is within the range indicated above, the advantageous effect tends to be more suitably achieved.

Examples of the isoprene-based rubbers include natural rubber (NR), polyisoprene rubber (IR), refined NR, modified NR, and modified IR. Any NR commonly used in the tire industry may be used, such as SIR20, RSS#3, and TSR20. Any IR may be used, including those commonly used in the tire industry such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These isoprene-based rubbers may be used alone, or two or more of these may be used in combination. Natural rubber is preferred among these.

The amount of the isoprene-based rubbers based on 100% by mass of the rubber component is preferably 10% by mass or more, more preferably 20% by mass or more, but is preferably 60% by mass or less, more preferably 50% by mass or less, still more preferably 40% by mass or less. When the amount is within the range indicated above, the advantageous effect tends to be more suitably achieved.

The combined amount of the BR and isoprene-based rubbers based on 100% by mass of the rubber component is preferably 30% by mass or more, more preferably 40% by mass or more, but is preferably 60% by mass or less, more preferably 50% by mass or less. When the combined amount is within the range indicated above, the advantageous effect tends to be more suitably achieved.

Herein, the weight average molecular weight (Mw) and the number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The cis content (cis-1,4-butadiene unit content) and the vinyl content (1,2-butadiene unit content) can be determined by infrared absorption spectrometry. The styrene content can be determined by $^1$H-NMR analysis.

The rubber composition preferably contains a resin.

To obtain a higher tan δ peak temperature and good wet grip performance, the resin preferably has a softening point of 80° C. or higher, more preferably 100° C. or higher, still more preferably 120° C. or higher, particularly preferably 130° C. or higher, most preferably 140° C. or higher. The upper limit of the softening point is not particularly limited, but is preferably 180° C. or lower, more preferably 160° C. or lower. When the softening point is within the range indicated above, the advantageous effect tends to be more suitably achieved.

The softening point of the resin is determined in accordance with JIS K 6220-1:2001 using a ring and ball softening point measuring apparatus and defined as the temperature at which the ball drops down.

Any resin may be used, and examples include coumarone resins, styrene resins, terpene resins, dicyclopentadiene resins (DCPD resins), C5 petroleum resins, C9 petroleum resins, C5/C9 petroleum resins, p-t-butylphenol acetylene resins, and acrylic resins. These may be used alone, or two or more of these may be used in combination.

These resins may be hydrogenated. Among these resins, terpene resins, styrene resins, and DCPD resins are preferred, with styrene resins being more preferred.

The term "styrene resins" refer to polymers produced from styrenic monomers as structural monomers, and examples include polymers produced by polymerization of styrenic monomers as main components (at least 50% by mass). Specific examples include homopolymers produced by polymerization of styrenic monomers (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene) alone, copolymers produced by copolymerization of two or more styrenic monomers, and copolymers of styrenic monomers and additional monomers copolymerizable therewith. These may be used alone, or two or more of these may be used in combination.

Examples of the additional monomers include acrylonitriles such as acrylonitrile and methacrylonitrile, unsaturated carboxylic acids such as acrylic acid and methacrylic acid, unsaturated carboxylic acid esters such as methyl acrylate and methyl methacrylate, dienes such as chloroprene, butadiene, and isoprene, olefins such as 1-butene and 1-pentene, and α,β-unsaturated carboxylic acids and acid anhydrides thereof such as maleic anhydride.

Among these styrene resins, α-methylstyrene resins (e.g., α-methylstyrene homopolymers, copolymers of α-methylstyrene and styrene) are preferred.

Any terpene resin having units derived from a terpene compound may be used. Examples include polyterpenes (resins produced by polymerization of terpene compounds), terpene aromatic resins (resins produced by copolymerization of terpene compounds with aromatic compounds), and aromatic-modified terpene resins (resins produced by modification of terpene resins with aromatic compounds). These may be used alone, or two or more of these may be used in combination. Polyterpenes are preferred among these.

The term "terpene compounds" refer to hydrocarbons having a composition represented by $(C_5H_8)$, and oxygen-containing derivatives thereof, which have a terpene backbone and are classified into monoterpenes $(C_{10}H_{16})$, sesquiterpenes $(C_{15}H_{24})$, diterpenes $(C_{20}H_{32})$, etc. Examples of such terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. Other examples of the terpene compounds include resin acids (rosin acids) such as abietic acid, neoabietic acid, palustric acid, levopimaric acid, pimaric acid, and isopimaric acid. In other words, the term "terpene resins" include rosin resins mainly containing rosin acids obtained by processing pine resin. Examples of the rosin resins include natural rosin resins (polymerized rosins) such as gum rosins, wood rosins, and tall oil rosins; modified rosin resins such as maleic acid-modified rosin resins and rosin-modified phenol resins; rosin esters such as rosin glycerol esters; and disproportionated rosin resins obtained by disproportionation of rosin resins.

The aromatic compounds may be any compound having an aromatic ring, and examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes. Styrene is preferred among these.

The resin may be a commercial product of, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., Taoka Chemical Co., Ltd., KRATON, or Exxon Mobil.

The amount of the resin per 100 parts by mass of the rubber component is preferably 7 parts by mass or more, more preferably 10 parts by mass or more, still more preferably 15 parts by mass or more, particularly preferably 20 parts by mass or more, but is preferably 50 parts by mass or less, more preferably 45 parts by mass or less, still more preferably 40 parts by mass or less. When the amount is within the range indicated above, the advantageous effect tends to be better achieved.

The rubber composition may contain silica.

Examples of the silica include dry silica (anhydrous silica) and wet silica (hydrous silica). Wet silica is preferred because it has a large number of silanol groups. These may be used alone, or two or more of these may be used in combination.

The silica preferably has a nitrogen adsorption specific surface area ($N_2SA$) of 100 $m^2/g$ or more, more preferably 150 $m^2/g$ or more, but preferably 300 $m^2/g$ or less, more preferably 200 $m^2/g$ or less. When the $N_2SA$ is within the range indicated above, the advantageous effect tends to be better achieved.

The $N_2SA$ of the silica is measured by the BET method in accordance with ASTM D3037-81.

The silica may be a commercial product of, for example, Degussa, Rhodia, Tosoh Silica Corporation, Solvay Japan, or Tokuyama Corporation.

The amount of the silica per 100 parts by mass of the rubber component is preferably 30 parts by mass or more, more preferably 50 parts by mass or more, still more preferably 70 parts by mass or more, particularly preferably 90 parts by mass or more, but is preferably 200 parts by mass or less, more preferably 150 parts by mass or less, still more preferably 120 parts by mass or less. When the amount is within the range indicated above, the advantageous effect tends to be better achieved.

In the rubber composition, the content of the silica based on 100% by mass of the total filler (reinforcing filler) is preferably 60% by mass or more, more preferably 70% by mass or more, still more preferably 80% by mass or more, particularly preferably 85% by mass or more. The upper limit is not particularly limited and may be 100% by mass.

The rubber composition, when containing silica, preferably further contains a silane coupling agent.

Examples of the silane coupling agent include, but are not limited to, sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. For example, commercial products of Degussa, Momentive, Shin-Etsu Silicone, Tokyo Chemical Industry Co., Ltd., AZmax. Co., Dow Corning Toray Co., Ltd., etc. may be used. These may be used alone, or two or more of these may be used in combination. Among these, sulfide or mercapto silane coupling agents are preferred, with mercapto silane coupling agents being more preferred, because then the advantageous effect tends to be better achieved.

Particularly suitable examples of mercapto silane coupling agents include silane coupling agents represented by the formula (S1) below and silane coupling agents containing linking units A and B represented by the formulas (I) and (II), respectively, below. Among these, silane coupling agents containing linking units A and B of the respective formulas (I) and (II) are preferred because then the advantageous effect tends to be better achieved.

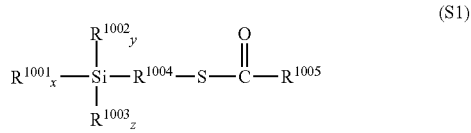

(S1)

In formula (S1), $R^{1001}$ represents a monovalent group selected from —Cl, —Br, —OR$^{1006}$, —O(O=)CR$^{1006}$, —ON=CR$^{1006}$R$^{1007}$, —ON=CR$^{1006}$R$^{1007}$, —NR$^{1006}$R$^{1007}$, and —(OSiR$^{1006}$R$^{1007}$)$_h$ (OSiR$^{1006}$R$^{1007}$R$^{1008}$) wherein R$^{1006}$, R$^{1007}$, and R$^{1008}$ may be the same or different and each represent a hydrogen atom or a C1-C18 monovalent hydrocarbon group, and h is 1 to 4 on average; R$^{1002}$ represents a hydrogen atom, or a C1-C18 monovalent hydrocarbon group; R$^{1003}$ represents R$^{1001}$, R$^{1002}$, a hydrogen atom, or the group: —[O(R$^{1009}$O)$_j$]$_{0.5}$— wherein R$^{1009}$ represents a C1-C18 alkylene group, and j represents an integer of 1 to 4; R$^{1004}$ represents a C1-C18 divalent hydrocarbon group; $R^{1005}$ represents a C1-C18 monovalent hydrocarbon group; and x, y, and z are numbers satisfying the following relationships: x+y+2z=3, 0≤x≤3, 0≤y≤2, and 0≤z≤1.

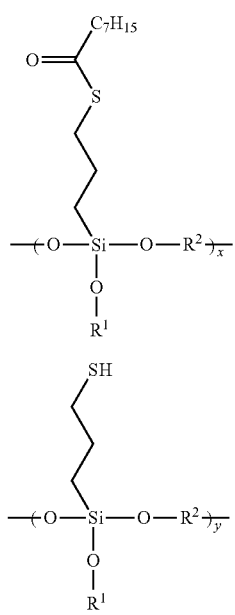

In formulas (I) and (II), x represents an integer of 0 or more; y represents an integer of 1 or more; $R_1$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl or carboxyl group; and $R^2$ represents a branched or unbranched C1-C30 alkylene group, a branched or unbranched C2-C30 alkenylene group, or a branched or unbranched C2-C30 alkynylene group, provided that $R^1$ and $R^2$ may together form a cyclic structure.

Preferably, $R^{1005}$, $R^{1006}$, $R^{1007}$, and $R^{1008}$ in formula (S1) are each independently selected from the group consisting of C1-C18 linear, cyclic, or branched alkyl, alkenyl, aryl, and aralkyl groups. When $R^{1002}$ is a C1-C18 monovalent hydrocarbon group, it is preferably selected from the group consisting of linear, cyclic, or branched alkyl, alkenyl, aryl, and aralkyl groups. $R^{1009}$ is preferably a linear, cyclic, or branched alkylene group, particularly preferably a linear alkylene group. Examples of $R^{1004}$ include C1-C18 alkylene groups, C2-C18 alkenylene groups, C5-C18 cycloalkylene groups, C6-C18 cycloalkylalkylene groups, C6-C18 arylene groups, and C7-C18 aralkylene groups. The alkylene and alkenylene groups may be linear or branched. The cycloalkylene, cycloalkylalkylene, arylene, and aralkylene groups may have a functional group such as a lower alkyl group on the ring. The group $R^{1004}$ is preferably a C1-C6 alkylene group, particularly preferably a linear alkylene group such as a methylene, ethylene, trimethylene, tetramethylene, pentamethylene, or hexamethylene group.

Specific examples of $R^{1002}$, $R^{1005}$, $R^{1006}$, $R^{1007}$, and $R^{1008}$ in formula (S1) include methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, cyclohexenyl, phenyl, tolyl, xylyl, naphthyl, benzyl, phenethyl, and naphthylmethyl groups.

Examples of $R^{1009}$ in formula (S1) include linear alkylene groups such as methylene, ethylene, n-propylene, n-butylene, and hexylene groups; and branched alkylene groups such as isopropylene, isobutylene, and 2-methylpropylene groups.

Specific examples of the silane coupling agents of formula (S1) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, and 2-lauroylthioethyltrimethoxysilane. These may be used alone, or two or more of these may be used in combination. Among these, 3-octanoylthiopropyltriethoxysilane is particularly preferred.

The linking unit A content of the silane coupling agents containing linking units A and B of the respective formulas (I) and (II) is preferably 30 mol % or higher, more preferably 50 mol % or higher, but is preferably 99 mol % or lower, more preferably 90 mol % or lower. The linking unit B content thereof is preferably 1 mol % or higher, more preferably 5 mol % or higher, still more preferably 10 mol % or higher, but is preferably 70 mol % or lower, more preferably 65 mol % or lower, still more preferably 55 mol % or lower. The combined content of the linking units A and B thereof is preferably 95 mol % or higher, more preferably 98 mol % or higher, particularly preferably 100 mol %.

The linking unit A or B content refers to the amount of the linking unit A or B, including the linking unit A or B present at the end of the silane coupling agent, if any. When the linking unit A or B is present at the end of the silane coupling agent, its form is not particularly limited as long as it forms a unit corresponding to formula (I) representing the linking unit A or formula (II) representing the linking unit B.

Examples of the halogen atom as $R^1$ include chlorine, bromine, and fluorine.

Examples of the branched or unbranched C1-C30 alkyl group as $R^1$ include methyl, ethyl, n-propyl, isopropyl, n-butyl, iso-butyl, sec-butyl, tert-butyl, pentyl, hexyl, heptyl, 2-ethylhexyl, octyl, nonyl, and decyl groups. The alkyl group preferably has 1 to 12 carbon atoms.

Examples of the branched or unbranched C2-C30 alkenyl group as $R^1$ include vinyl, 1-propenyl, 2-propenyl, 1-butenyl, 2-butenyl, 1-pentenyl, 2-pentenyl, 1-hexenyl, 2-hexenyl, and 1-octenyl groups. The alkenyl group preferably has 2 to 12 carbon atoms.

Examples of the branched or unbranched C2-C30 alkynyl group as $R^1$ include ethynyl, propynyl, butynyl, pentynyl, hexynyl, heptynyl, octynyl, nonynyl, decynyl, undecynyl, and dodecynyl groups. The alkynyl group preferably has 2 to 12 carbon atoms.

Examples of the branched or unbranched C1-C30 alkylene group as $R^2$ include ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups. The alkylene group preferably has 1 to 12 carbon atoms.

Examples of the branched or unbranched C2-C30 alkenylene group as $R^2$ include vinylene, 1-propenylene, 2-propenylene, 1-butenylene, 2-butenylene, 1-pentenylene, 2-pentenylene, 1-hexenylene, 2-hexenylene, and 1-octenylene groups. The alkenylene group preferably has 2 to 12 carbon atoms.

Examples of the branched or unbranched C2-C30 alkynylene group as $R^2$ include ethynylene, propynylene, butynylene, pentynylene, hexynylene, heptynylene, octynylene, nonynylene, decynylene, undecynylene, and dodecynylene groups. The alkynylene group preferably has 2 to 12 carbon atoms.

In the silane coupling agents containing linking units A and B of the respective formulas (I) and (II), the total number of repetitions (x+y) consisting of the sum of the number of repetitions (x) of the linking unit A and the number of repetitions (y) of the linking unit B is preferably in the range of 3 to 300.

The amount of the silane coupling agent per 100 parts by mass of the silica is preferably 3 parts by mass or more, more preferably 5 parts by mass or more, but is preferably 20 parts by mass or less, more preferably 15 parts by mass or less. When the amount is within the range indicated above, the advantageous effect tends to be better achieved.

The rubber composition may contain carbon black.

Examples of the carbon black include, but are not limited to, N134, N110, N220, N234, N219, N339, N330, N326, N351, N550, and N762. These may be used alone, or two or more of these may be used in combination.

The carbon black preferably has a nitrogen adsorption specific surface area (N2SA) of 80 $m^2/g$ or more, more preferably 100 $m^2/g$ or more, but preferably 150 $m^2/g$ or less, more preferably 130 $m^2/g$ or less. When the N2SA is within the range indicated above, the advantageous effect tends to be better achieved.

Herein, the N2SA of the carbon black is measured in accordance with JIS K6217-2:2001.

The carbon black may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd, or Columbia Carbon.

The amount of the carbon black per 100 parts by mass of the rubber component is preferably 5 parts by mass or more, more preferably 8 parts by mass or more, but is preferably 50 parts by mass or less, more preferably 20 parts by mass or less. When the amount is within the range indicated above, the advantageous effect tends to be more suitably achieved.

The rubber composition may contain an oil.

Examples of the oil include process oils, plant oils, and mixtures thereof. Examples of the process oils include paraffinic process oils, aromatic process oils, naphthenic process oils, mild extraction solvates (MES), and treated distillate aromatic extracts (TDAE). Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. These may be used alone, or two or more of these may be used in combination. To achieve the advantageous effect well, process oils are preferred among these, with MES or TDAE being preferred.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil per 100 parts by mass of the rubber component is preferably 5 parts by mass or more, more preferably 10 parts by mass or more, but is preferably 50 parts by mass or less, more preferably 30 parts by mass or less. When the amount is within the range indicated above, the advantageous effect tends to be better achieved.

The rubber composition may contain a wax.

Examples of the wax include, but are not limited to, petroleum waxes such as paraffin waxes and microcrystalline waxes; naturally-occurring waxes such as plant waxes and animal waxes; and synthetic waxes such as polymers of ethylene, propylene, or other similar monomers. These may be used alone, or two or more of these may be used in combination. Among these, petroleum waxes are preferred, with paraffin waxes being more preferred.

The wax may be a commercial product of, for example, Ouchi Shinko Chemical Industrial Co., Ltd., Nippon Seiro Co., Ltd., or Seiko Chemical Co., Ltd.

The amount of the wax per 100 parts by mass of the rubber component is preferably 0.3 parts by mass or more, more preferably 0.5 parts by mass or more, but is preferably 20 parts by mass or less, more preferably 10 parts by mass or less. When the amount is within the range indicated above, the advantageous effect tends to be better achieved.

The rubber composition may contain an antioxidant.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. These may be used alone, or two or more of these may be used in combination. Among these, p-phenylenediamine or quinoline antioxidants are preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

The amount of the antioxidant per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain stearic acid.

The stearic acid may be a conventional one, and examples include commercial products of NOF Corporation, Kao Corporation, FUJIFILM Wako Pure Chemical Corporation, and Chiba Fatty Acid Co., Ltd.

The amount of the stearic acid per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain zinc oxide.

The zinc oxide may be a conventional one, and examples include commercial products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone, or two or more of these may be used in combination.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur per 100 parts by mass of the rubber component is preferably 0.1 parts by mass or more, more preferably 0.5 parts by mass or more, but is preferably 10 parts by mass or less, more preferably 5 parts by mass or less, still more preferably 3 parts by mass or less. When the amount is within the range indicated above, the advantageous effect tends to be better achieved.

The rubber composition may contain a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination. To more suitably achieve the advantageous effect, sulfenamide and/or guanidine vulcanization accelerators are preferred among these, with combinations of sulfenamide and guanidine vulcanization accelerators being preferred.

The vulcanization accelerator may be a commercial product of, for example, Kawaguchi Chemical Industry Co., Ltd. or Ouchi Shinko Chemical Industrial Co., Ltd.

The amount of the vulcanization accelerator per 100 parts by mass of the rubber component is preferably 1 part by mass or more, more preferably 2 parts by mass or more, but is preferably 10 parts by mass or less, more preferably 7 parts by mass or less. When the amount is within the range indicated above, the advantageous effect tends to be better achieved.

In addition to the above-mentioned components, the rubber composition may contain additives commonly used in the tire industry, such as organic peroxides, and fillers such as calcium carbonate, talc, alumina, clay, aluminum hydroxide, and mica. The amount of the additives per 100 parts by mass of the rubber component is preferably 0.1 to 200 parts by mass.

The rubber composition may be prepared, for example, by kneading the components in a rubber kneading machine such as an open roll mill or a Banbury mixer, and then vulcanizing the kneaded mixture.

The kneading conditions are as follows. In a base kneading step of kneading additives other than vulcanizing agents and vulcanization accelerators, the kneading temperature is usually 100 to 180° C., preferably 120 to 170° C.

In a final kneading step of kneading vulcanizing agents and vulcanization accelerators, the kneading temperature is usually 120° C. or lower, and preferably 80 to 110° C. The composition obtained after kneading vulcanizing agents and vulcanization accelerators is usually vulcanized by, for example, press vulcanization. The vulcanization temperature is usually 140 to 190° C., preferably 150 to 185° C. The vulcanization time is usually 5 to 15 minutes.

The rubber composition is for use in tire treads. For use in a tread consisting of a cap tread and a base tread, the rubber composition can be suitably used in the cap tread.

The pneumatic tire of the present invention can be produced using the rubber composition by usual methods.

Specifically, the unvulcanized rubber composition may be extruded into the shape of a tread component and then assembled with other tire components on a tire building machine in a usual manner to build an unvulcanized tire, which may then be heated and pressurized in a vulcanizer to obtain a tire.

It is sufficient that the tread of the pneumatic tire at least partially contain the rubber composition. The entire tread may contain the rubber composition.

The pneumatic tire is suitable for use as a tire for passenger vehicles, large passenger vehicles, large SUVs, trucks and buses, or two-wheeled vehicles, or as a racing tire, a cold weather tire (studless winter tire), an all-season tire, a run-flat tire, an aircraft tire, a mining tire, or other tires.

Examples

The present invention is specifically described with reference to examples, but the present invention is not limited to the examples.

The chemicals used in the examples and comparative examples are listed below.

SBR 1: Buna VSL5025 (styrene content: 25% by mass, vinyl content: 50% by mass, glass transition temperature: −29° C.) available from ARLANXEO SBR 2: Buna VSL-2525 (styrene content: 25% by mass, vinyl content: 25% by mass, glass transition temperature: −49° C.) available from ARLANXEO

NR: TSR20

BR: BR150B (cis content: 97% by mass) available from Ube Industries, Ltd.

Carbon black: Diablack N220 (N2SA: 114 $m^2/g$) available from Mitsubishi Chemical Corporation Silica: ULTRASIL VN3 (N2SA: 175 $m^2/g$) available from Evonik Degussa Silane coupling agent: NXT-Z45 (a copolymer of linking units A and B, linking unit A: 55 mol %, linking unit B: 45 mol %) available from Momemtive Resin A: sylvatraxx 4401 (α-methylstyrene resin, softening point: 85° C.) available from KRATON Resin B: SA120 (α-methylstyrene resin, softening point: 120° C.) available from KRATON Resin C: sylvatraxx 4150 (polyterpene, softening point: 150° C.) available from KRATON Resin D: sylvatraxx 4120 (polyterpene, softening point: 120° C.) available from KRATON Resin E: PR120 (hydrogenated DCPD resin, softening point: 120° C.) available from Exxon Mobil
TDAE oil: VivaTec 400 (TDAE oil) available from H&R
Stearic acid: stearic acid beads "TSUBAKI" available from NOF Corporation
Zinc oxide: zinc oxide #3 available from HakusuiTech Co., Ltd.
Antioxidant: NOCRAC 6C (N-(1,3-dimethylbutyl)-N'-phenyl-p-phenylenediamine) available from Ouchi Shinko Chemical Industrial Co., Ltd.
Wax: Ozoace 0355 available from Nippon Seiro Co., Ltd.
Sulfur: powdered sulfur available from Tsurumi Chemical Industry Co., Ltd.
Vulcanization accelerator 1: NOCCELER NS (N-tert-butyl-2-benzothiazolylsulfenamide) available from Ouchi Shinko Chemical Industrial Co., Ltd.
Vulcanization accelerator 2: NOCCELER D (diphenylguanidine) available from Ouchi Shinko Chemical Industrial Co., Ltd.

Examples and Comparative Examples

The chemicals other than the sulfur and the vulcanization accelerators in the amounts indicated in Table 1 were kneaded at 150° C. for five minutes using a 1.7 L Banbury mixer (Kobe Steel, Ltd.) to give a kneaded mixture. Then, the sulfur and vulcanization accelerators were added to the kneaded mixture, and they were kneaded at 80° C. for five minutes using an open roll mill to obtain an unvulcanized rubber composition.

The unvulcanized rubber composition was press-vulcanized at 170° C. for 10 minutes to obtain a vulcanized rubber composition.

Separately, the unvulcanized rubber composition was formed into a cap tread shape and assembled with other tire components to build an unvulcanized tire. The unvulcanized tire was press-vulcanized at 170° C. for 10 minutes to prepare a test tire (size: 195/65R15).

The vulcanized rubber compositions and test tires prepared as above were evaluated as described below. Table 1 shows the results.

(Brittleness Temperature)

The vulcanized rubber compositions were measured for "50% brittleness temperature" in accordance with JIS K 6261-2:2017 "Rubber, vulcanized or thermoplastic—Determination of low-temperature properties—Part 2: Low-temperature brittleness".

(Tan δ Peak Temperature)

Specimens of a predetermined size prepared from the vulcanized rubber compositions were tested using a viscoelastic spectrometer VES (Iwamoto Seisakusho Co., Ltd.) at an initial strain of 10%, a dynamic strain of 0.5%, a frequency of 10 Hz, an amplitude of ±0.25%, and a rate of temperature increase of 2° C./min to determine temperature dependence curves of tan δ over the temperature range of –100 to 100° C. The temperature corresponding to the maximum tan δ in each temperature dependence curve was taken as the tan δ peak temperature.

(Wet Grip Performance)

The test tire of each example was mounted on each wheel of a front-engine, front-wheel-drive car of 2000 cc displacement made in Japan. The braking distance of the car with an initial speed of 100 km/h under wet asphalt conditions was determined and expressed as an index (wet skid performance index), with Comparative Example 1 set equal to 100. A higher index indicates a shorter braking distance and therefore better wet skid performance (wet grip performance).

(Resistance to Low-Temperature Brittleness)

The test tires were stored at –40° C. in a warehouse for three months. After the storage, the tread surface and groove bottom of the test tires were inspected for the presence of cracks. Tires with a rating of A or B are considered to have good resistance to low-temperature brittleness which can reduce cracking on the tread surface or groove bottom during storage of the tires in winter.

A: No cracks found
B: Cracks smaller than 3 mm found
C: Cracks greater than or equal to 3 mm found

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Amount (parts by mass) | | | | | | | | | |
| SBR 1 | 60 | 50 | 50 | 60 | 50 | 50 | 60 | — | 50 |
| SBR 2 | — | — | — | — | — | — | — | 50 | — |
| NR | — | — | — | — | — | — | 30 | — | — |
| BR | 40 | 50 | 50 | 40 | 50 | 50 | 10 | 50 | 50 |
| Carbon black | 10 | 10 | 10 | 10 | 10 | 10 | 10 | 10 | 10 |
| Silica | 100 | 100 | 100 | 100 | 100 | 100 | 100 | 100 | 100 |
| Silane coupling agent | 8 | 8 | 8 | 8 | 8 | 8 | 8 | 8 | 8 |
| Resin A | 20 | 30 | 20 | — | — | — | 15 | 10 | — |
| Resin B | — | — | — | 20 | 30 | 20 | — | 30 | — |
| Resin C | — | — | — | — | — | — | — | — | 30 |
| Resin D | — | — | — | — | — | — | — | — | — |
| Resin E | — | — | — | — | — | — | — | — | — |
| TDAE oil | 20 | 20 | 20 | 20 | 20 | 20 | 20 | 20 | 20 |
| Stearic acid | 2 | 2 | 2 | 2 | 2 | 2 | 2 | 2 | 2 |
| Zinc oxide | 2 | 2 | 2 | 2 | 2 | 2 | 2 | 2 | 2 |
| Antioxidant | 1 | 1 | 1 | 1 | 1 | 1 | 1 | 1 | 1 |
| Wax | 1 | 1 | 1 | 1 | 1 | 1 | 1 | 1 | 1 |

TABLE 1-continued

| | | | | | | | | | |
|---|---|---|---|---|---|---|---|---|---|
| Sulfur | 1.5 | 1.5 | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 | 1.5 | 1.5 |
| Vulcanization accelerator 2 | 2 | 2 | 2 | 2 | 2 | 2 | 2 | 2 | 2 |
| Evaluation result | | | | | | | | | |
| Brittleness temperature (° C.) | −42 | −51 | −55 | −41 | −50 | −53 | −45 | −55 | −50 |
| tan δ peak temperature (° C.) | −8 | −8 | −10 | −5 | −6 | −10 | −8 | −5 | −7 |
| Wet grip performance | 120 | 118 | 115 | 125 | 120 | 116 | 123 | 120 | 116 |
| Resistance to low-temperature brittleness | A | A | A | B | A | A | A | A | A |

| | Ex. 10 | Ex. 11 | Ex. 12 | Ex. 13 | Ex. 14 | Ex. 15 | Comp. Ex. 1 | Comp. Ex. 2 | Comp. Ex. 3 |
|---|---|---|---|---|---|---|---|---|---|
| Amount (parts by mass) | | | | | | | | | |
| SBR 1 | 50 | 50 | 50 | 50 | 50 | 50 | 80 | 60 | 80 |
| SBR 2 | — | — | — | — | — | — | — | — | — |
| NR | — | — | — | — | — | — | — | — | — |
| BR | 50 | 50 | 50 | 50 | 50 | 50 | 20 | 40 | 20 |
| Carbon black | 10 | 10 | 10 | 10 | 10 | 10 | 10 | 10 | 10 |
| Silica | 100 | 100 | 100 | 100 | 100 | 80 | 100 | 100 | 100 |
| Silane coupling agent | 8 | 8 | 8 | 8 | 8 | 6.4 | 8 | 8 | 8 |
| Resin A | — | — | — | — | — | 30 | 5 | 5 | 20 |
| Resin B | — | — | — | — | — | — | — | — | — |
| Resin C | — | — | 20 | — | — | — | — | — | — |
| Resin D | 30 | — | — | 20 | — | — | — | — | — |
| Resin E | — | 30 | — | — | 20 | — | — | — | — |
| TDAE oil | 20 | 20 | 20 | 20 | 20 | 20 | 20 | 20 | 20 |
| Stearic acid | 2 | 2 | 2 | 2 | 2 | 2 | 2 | 2 | 2 |
| Zinc oxide | 2 | 2 | 2 | 2 | 2 | 2 | 2 | 2 | 2 |
| Antioxidant | 1 | 1 | 1 | 1 | 1 | 1 | 1 | 1 | 1 |
| Wax | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 | 1.5 | 1.5 |
| Vulcanization accelerator 2 | 2 | 2 | 2 | 2 | 2 | 2 | 2 | 2 | 2 |
| Evaluation result | | | | | | | | | |
| Brittleness temperature (° C.) | −52 | −51 | −52 | −53 | −53 | −43 | −38 | −43 | −28 |
| tan δ peak temperature (° C.) | −9 | −7 | −9 | −10 | −8 | −8 | −23 | −17 | −3 |
| Wet grip performance | 114 | 118 | 113 | 112 | 115 | 116 | 100 | 103 | 128 |
| Resistance to low-temperature brittleness | A | A | A | A | A | A | C | A | C |

Ex.: Example
Comp. Ex.: Comparative Example

As shown in Table 1, the examples containing a styrene-butadiene rubber and having a tan δ peak temperature of −10° C. or higher and a brittleness temperature of −40° C. or lower achieved a balanced improvement in wet grip performance and resistance to low-temperature brittleness.

The invention claimed is:

1. A pneumatic tire, comprising a tread at least partially comprising a tread rubber composition, the tread rubber composition comprising a styrene-butadiene rubber and having a tan δ peak temperature of −10° C. or higher and a brittleness temperature of −43° C. or lower,
wherein the tread rubber composition comprises, per 100 parts by mass of a rubber component therein, 5 to 20 parts by mass of a carbon black, and
wherein the styrene-butadiene rubber has a glass transition temperature (Tg) of from −49° C. to −29° C.

2. The pneumatic tire according to claim 1,
wherein the tread rubber composition has a tan δ peak temperature of −8° C. or higher.

3. The pneumatic tire according to claim 1,
wherein the tread rubber composition has a tan δ peak temperature of −6° C. or higher.

4. The pneumatic tire according to claim 1,
wherein the tread rubber composition has a brittleness temperature of −45° C. or lower.

5. The pneumatic tire according to claim 1,
wherein the tread rubber composition comprises, based on 100% by mass of a rubber component therein, 20 to 90% by mass of the styrene-butadiene rubber.

6. The pneumatic tire according to claim 1,
wherein the tread rubber composition comprises at least one of a polybutadiene rubber or isoprene-based rubber.

7. The pneumatic tire according to claim 1,
wherein the styrene-butadiene rubber has a vinyl content of 5% by mass to 50% by mass.

8. The pneumatic tire according to claim 1,
wherein the tread rubber composition comprises, based on 100% by mass of a rubber component therein, 40% by mass or more of polybutadiene rubber and isoprene-based rubber in total.

9. The pneumatic tire according to claim 1,
wherein the tread rubber composition comprises, per 100 parts by mass of a rubber component therein, 7 to 50 parts by mass of a resin.

10. The pneumatic tire according to claim 9,
wherein the resin is at least one selected from the group consisting of coumarone resin, styrene resin, terpene resin, dicyclopentadiene resin, petroleum resin, p-t-butylphenol acetylene resin, and acrylic resin.

11. A pneumatic tire, comprising a tread at least partially comprising a tread rubber composition, the tread rubber composition comprising a styrene-butadiene rubber and having a tan δ peak temperature of −10° C. or higher and a brittleness temperature of −43° C. or lower,
wherein the tread rubber composition comprises, based on 100% by mass of a rubber component therein, 40% by mass or more of polybutadiene rubber and isoprene-based rubber in total, and
wherein the styrene-butadiene rubber has a glass transition temperature (Tg) of from −49° ° C. to −29° C.

12. A pneumatic tire, comprising a tread at least partially comprising a tread rubber composition, the tread rubber composition comprising a styrene-butadiene rubber and having a tan δ peak temperature of −10° ° C. or higher and a brittleness temperature of −43° C. or lower,
wherein the tread rubber composition comprises, per 100 parts by mass of a rubber component therein, 7 to 50 parts by mass of a resin, and
wherein the styrene-butadiene rubber has a glass transition temperature (Tg) of from −49° ° C. to −29° C.

* * * * *